US012810059B2

(12) United States Patent
Harsola et al.

(10) Patent No.: US 12,810,059 B2
(45) Date of Patent: Nov. 24, 2026

(54) AUTOMATIC INVOICE TEMPLATE GENERATION BASED ON INFORMATION EXTRACTED FROM INDIVIDUAL INVOICES

(71) Applicant: INTUIT INC., Mountain View, CA (US)

(72) Inventors: Shrutendra Harsola, Bangalore (IN); Polavarapu Viswa Datha, Bangalore (IN); Azal Fatima, Bangalore (IN)

(73) Assignee: INTUIT INC., Mountain View, CA (US)

( * ) Notice: Subject to any disclaimer, the term of this patent is extended or adjusted under 35 U.S.C. 154(b) by 197 days.

(21) Appl. No.: 18/412,448

(22) Filed: Jan. 12, 2024

(65) Prior Publication Data

US 2025/0232111 A1 Jul. 17, 2025

(51) Int. Cl.
*G06F 40/186* (2020.01)
*G06F 40/40* (2020.01)
*G06V 30/412* (2022.01)

(52) U.S. Cl.
CPC ............ *G06F 40/186* (2020.01); *G06F 40/40* (2020.01); *G06V 30/412* (2022.01)

(58) Field of Classification Search
CPC ...... G06F 40/186; G06F 40/40; G06V 30/412
See application file for complete search history.

(56) References Cited

U.S. PATENT DOCUMENTS

| | | | | |
|---|---|---|---|---|
| 9,652,790 B2 * | 5/2017 | Anand | G06Q 30/0601 |
| 10,482,171 B2 * | 11/2019 | Jain | G06F 40/134 |
| 11,960,827 B1 * | 4/2024 | Chao | H04L 63/083 |
| 12,361,138 B1 * | 7/2025 | Kung | G06N 3/08 |
| 2016/0171627 A1 * | 6/2016 | Lyubarskiy | G06Q 40/12 705/30 |
| 2019/0354578 A1 * | 11/2019 | Shen | G06F 40/40 |
| 2022/0188885 A1 * | 6/2022 | Blackman | G06F 16/182 |
| 2023/0004604 A1 * | 1/2023 | Li | G06N 5/048 |
| 2023/0334025 A1 * | 10/2023 | Halko | G06F 16/21 |

* cited by examiner

*Primary Examiner* — Pierre Louis Desir
*Assistant Examiner* — Keisha Y. Castillo-Torres
(74) *Attorney, Agent, or Firm* — DLA PIPER LLP US

(57) ABSTRACT

An electronic copy of an existing invoice is used to extract text therefrom. The extracted text is processed using a hybrid approach—combining fuzzy matching and natural language processing—to map portions of the extracted text to a computer application's specific standard fields. The initial stage is fuzzy matching to map portions of the extracted text to a dictionary of standard fields. For the unmapped portions of the text, natural language processing models such as a fine-tuned DistilBERT model is invoked to determine a second stage mappings. Mappings from the two stages are combined and duplicates are removed to generate a final mapping. The final mapping and the geometrical information of the extracted text is used to generate an electronic template of the invoice. The electronic template can be used to generate future invoices with the same/similar formatting or look and feel of the existing invoice.

12 Claims, 8 Drawing Sheets

200

200

SPECTRUM
LAWYERS & CONSULTANTS

Spectrum Lawyers & Consultants
ABN 31 430 396 164
PO BOX 527, Altona Vic 3018
0428 545 688
donna@spectrumlaw.net.au

TO:
Dr. Charlott Gusikowski
Apt. 736 0617 Donnelly Circles,
Marinetown, SD 79858

TAX INVOICE

INVOICE # 846.68
DATE: 04/01/2011

FOR:

| DESCRIPTION | HOURS | RATE | GST | AMOUNT |
|---|---|---|---|---|
| A Glass of Blessings<br>In a Glass Darkly | 441 | 602.17 | 50% S | 337.0 |
| For Whom the Bell Tolls<br>Antic Hay | 120 | 461.68 | 52% S | 186.75 |

TOTAL 813.85

Total payment to be received within 7 days of invoice.
Account Name: Donna Abu-Elias T/AS Spectrum Lawyers & Consultants
BSB: 033161 (Westpac)
Account: 278303
Ref: 846.68

Thank you for your prompt payment and we look forward to working with you again!

302

FIG. 3

402 404 406

| Invoice_Field_Extracted | QBO_Field_Mapped | field_value |
|---|---|---|
| INVOICE # | refnumber | 846.68 |
| DATE: | date | 04/01/2011 |
| TOTAL | total | 813.85 |
| Ref: | None | 846.68 |
| Account: | None | 278303 |
| BSB: | None | 033161 (Westpac) |
| Account Name: | None | Donna Abu-Elias T/AS Spectrum Lawyers & Consul... |

400

FIG. 4

502 504

| question | prediction |
|---|---|
| amountpaid | 337.0 |
| billingaddress | Apt. 736 0617 Donnelly Circles, Marinetown, SD... |
| companyemail | donna@spectrumlaw.net.au |
| companyname | Spectrum Lawyers & Consultants |
| companyphone | 0428 545 688 |
| companywebsite | donna@spectrumlaw.net.au |
| customername | Dr. Charlott Gusikowski |
| shippingaddress | Apt. 736 0617 Donnelly Circles, Marinetown, SD... |

500

FIG. 5

602 604

| QBO Field | value |
|---|---|
| refnumber | 846.68 |
| date | 04/01/2011 |
| total | 813.85 |
| itemdescription | [A Glass of Blessings\nin a Glass Darkly, For ... |
| rate | [602.17 , 461.68 ] |
| amount | [337.0 , 186.75 ] |
| amountpaid | 337.0 |
| billingaddress | Apt. 736 0617 Donnelly Circles,\nMarinetown, S... |
| companyemail | donna@spectrumlaw.net.au |
| companyname | Spectrum Lawyers & Consultants |
| companyphone | 0428 545 688 |
| customername | Dr. Charlott Gusikowski |
| subtotal | 602.17 |
| None | 846.68 |
| None | 278303 |

600

FIG. 6

SPECTRUM
LAWYERS & CONSULTANTS

Spectrum Lawyers & Consultants
ABN 31 430 396 164
PO BOX 527, Altona Vic 3018
0428 545 688
donna@spectrumlaw.net.au

TO:

TAX INVOICE

INVOICE #
DATE:

FOR:

| DESCRIPTION | HOURS | RATE | GST | AMOUNT |
|---|---|---|---|---|
| | | | | |
| | | | | |

TOTAL

Total payment to be received within 7 days of invoice.
Account Name:
BSB:
Account:
Ref:

Thank you for your prompt payment and we look forward to working with you again!

702

FIG. 7

AUTOMATIC INVOICE TEMPLATE GENERATION BASED ON INFORMATION EXTRACTED FROM INDIVIDUAL INVOICES

BACKGROUND

Computer implemented applications have significantly changed business operations over the past few decades. Physical logbooks, journals, ledgers, paper files of receipts and invoices, etc. have given way to computer storage and analysis. While large businesses were early to adopt large computing infrastructure and complex computer applications, computer applications such as QuickBooks® from Intuit® of Mountain View, California have been widely adopted by small businesses. QuickBooks® and similar computer applications automate and simplify tedious and laborious back-end operations. When the routine operations are automated, human capital can be rightly used for creative thinking, problem solving, etc.

A whole host of technical problems have to be solved to automate the manual operations using computer applications. The main technical problems of coding the computer applications in the first place and the computer applications automating high-level operations have already been solved—but there are always novel and interesting technical problems that arise constantly within the broader technical solution context.

For instance, businesses may switch between different computer application vendors. The application vendors may use different formats for business documents. An invoice, for example, may be printed differently across different computer applications. The invoice may have different field names ("Shipping Address" vs. "Ship To") and/or may have different spatial organization of the presented information. Switching between the different computer applications provides an interesting technical challenge if the format—e.g., look and feel—of the invoice is to be maintained across the applications. The conventional response to the problem is for the new computer application to request the business owner to manually define a template. The business owner generally references an invoice generated by the old computer application and manually creates/modifies a template in an interface of the new computer application, such that the new invoices have similar formatting as the old invoices. This manual solution is of course undesirable. In other words, a technical solution is desired to support "format porting" between different computer applications.

SUMMARY

Embodiments disclosed herein solve the aforementioned technical problems and may provide other solutions as well. An electronic copy of an existing invoice is used to extract text therefrom. The extracted text is processed using a hybrid approach—by combining fuzzy matching and natural language processing—to map portions of the extracted text to a computer application's specific standard fields. The initial stage is fuzzy matching to map portions of the extracted text to a dictionary of standard fields. For the unmapped portions of the text, natural language processing models such as a fine-tuned DistilBERT model is invoked to determine second stage mappings. Mappings from the two stages are combined and duplicates are removed to generate a final mapping. The final mapping and the geometrical information of the extracted text is used to generate an electronic template of the invoice. The electronic template can be used to generate future invoices with the same/similar formatting or look and feel of the existing invoice.

BRIEF DESCRIPTION OF THE DRAWINGS

The drawings are presented to illustrate various aspects of the principles disclosed herein. As the purpose is merely illustration, the drawings are not to be considered limiting.

FIG. 3 shows a detailed view of an example invoice based on the principles disclosed herein.

FIG. 4 shows an example mapping between extracted fields and standard fields generated through fuzzy matching, based on the principles disclosed herein.

FIG. 5 shows an example mapping generated by the DistilBERT model, based on the principles disclosed herein.

FIG. 6 shows a final mapping based on the combination of fuzzy matching and a DistilBERT model-based matching, based on the principles disclosed herein.

FIG. 7 shows an electronic template, based on the principles disclosed herein.

DETAILED DESCRIPTION OF SEVERAL EMBODIMENTS

Embodiments disclosed herein generate electronic templates for invoices using information extracted from existing invoices. A user uploads an electronic invoice and text may be extracted therefrom. A fuzzy matching operation is first performed on the extracted text to map portions of the extracted text to different standard fields of a computer application (e.g., QuickBooks®). A fine-tuned DistilBERT model is used to determine additional mappings for the non-mapped portions. Mappings from both algorithms are combined to generate a final mapping. The final mapping is used to generate an electronic template for future invoices, where the electronic template replicates the format or the "look and feel" of the originally uploaded invoice. Therefore, the user does not have to manually recreate an invoice when switching to a new computer application.

Figure 1:
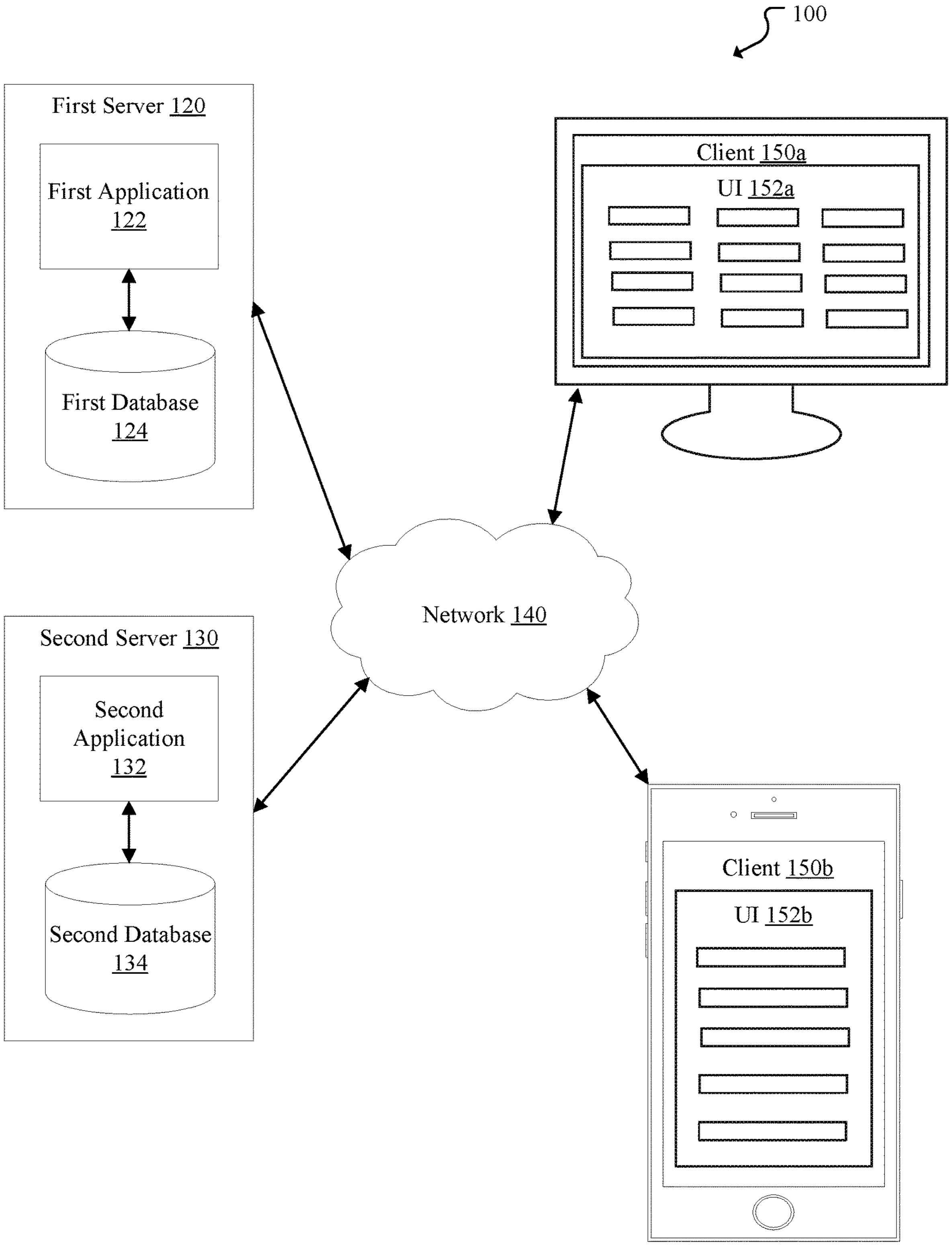
FIG. 1 shows an example of a system configured for generating an electronic invoice template, based on the principles disclosed herein.

FIG. 1 shows an example of a system 100 configured for generating an electronic invoice template, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150*a*, 150*b* (collectively referred to herein as "client devices 150"), and first and second servers 120, 130 interconnected by a network 140. The first server 120 hosts a first server application 122 and a first database 124 and the second server 130 hosts a second server application 132 and a second database 134. The client devices 150*a*, 150*b* have user interfaces 152*a*, 152*b*, respectively (collectively referred to herein as "user interfaces (UIs) 152"), which may be used to communicate with the server applications 122, 132 via the network 140.

The server applications 122, 132 implement the various operations disclosed throughout this disclosure. For example, the server applications 122, 132 receive an electronic invoice from the client devices 150. The server applications 122, 132 may extract text and the corresponding geometrical information from the electronic invoice. The server applications 122, 132 may first perform a fuzzy matching on the extracted text to map different portions of the extracted text a dictionary of standard fields recognized by a computer application (e.g., QuickBooks®). To find additional mappings, the server applications 122, 132 invoke a fine-tuned DistilBERT model. The mappings from both algorithms are combined to generate a final mapping. The final mapping is used by the server applications 122, 132 to generate an electronic template for the received electronic invoice.

The server applications 122, 132 use the databases 124, 134 during the various operations. For example, the databases 124, 134 store the received electronic invoice, text extracted from the electronic invoice, fuzzy matching algorithm and the corresponding dictionary, the DistilBERT algorithm, and/or any other data required for the performance of the disclosed and/or other operations. The databases 124, 134 further store the electronic templates.

In addition to the data for the operations, the databases 124, 134 may further store the programming scripts that may be required to implement the principles disclosed herein. For example, the databases 124, 134 can store instructions for executing the corresponding server applications 122, 132. It should be understood that the databases 124, 134 may be implemented in any form, including, but not limited to, a relational database, an object-oriented database, a distributed database, and/or any other form of database.

Client devices 150 may include any device configured to present the user UIs 152 and receive user inputs through the UIs. The UIs 152 can be graphical user interfaces or command line interfaces. Regardless of the type of the UIs 152, they provide a window or any type of location for the users to provide their inputs. The inputs include, for example, an electronic invoice, an instruction to generate an electronic template from the electronic invoice, etc.

Communication between the different components of the system 100 is facilitated by one or more APIs. APIs of system 100 may be proprietary and or may include such APIs as AWS APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

First server 120, second server 130, first database 124, second database 134, and client devices 150 are each depicted as single devices for ease of illustration, but those of ordinary skill in the art will appreciate that first server 120, second server 130, first database 124, second database 134, and/or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one) servers. In another example, a plurality of client devices 150 may communicate with first server 120 and/or second server 130.

A single user may have multiple client devices 150, and/or there may be multiple users each having their own client devices 150.

Furthermore, it should be understood that the illustrated applications 122, 132 running on the servers 120, 130, and the databases 124, 134 being hosted by the servers 120, 130 are examples for carrying out the disclosed principles, and should not be considered limiting. Different portions of the server applications 122, 132 and, in one or more embodiments, the entirety of the server applications 122, 132 can be stored in the client devices 150. Similarly, different portions or even the entirety of the databases 124, 134 can be stored in the client devices 150. Therefore, the functionality described throughout this disclosure can be implemented at any portion of the system 100.

Figure 2:
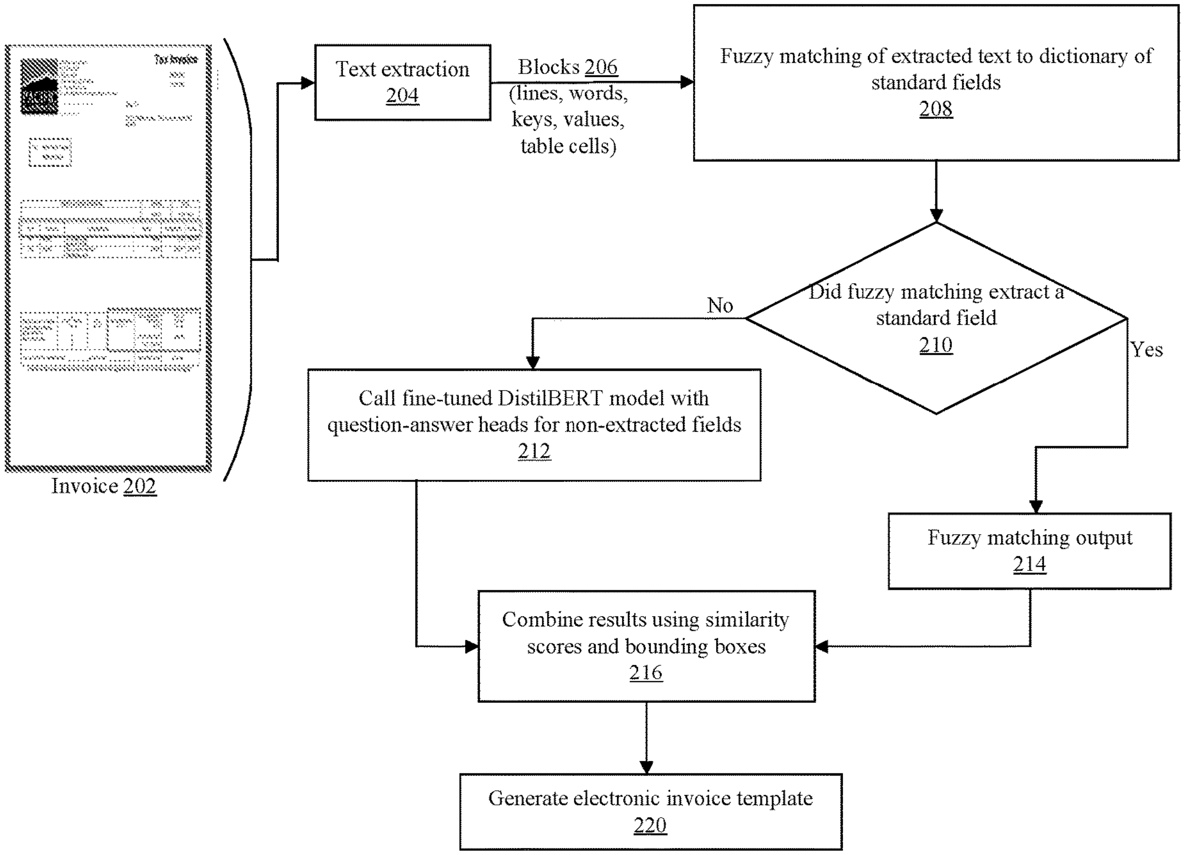
FIG. 2 shows a flow diagram of an example method of generating an electronic invoice template, based on the principles disclosed herein.

FIG. 2 shows a flow diagram of an example method 200 of generating an electronic invoice template, based on the principles disclosed herein. It should, however, be understood that the components and functionality of the method 200 are provided as examples and should not be considered limiting. Therefore, methods with alternative, additional, or fewer number of steps/functionality should be considered within the scope of this disclosure. The method 200 may be performed by any combination of components of the system 100 shown in FIG. 1.

As shown, the method 200 takes in an invoice 202, which may be in any format such as e.g., PDF, MS-Word, or the like. The invoice 202 may be uploaded by a user and/or stored in a database. Text extraction 204 is performed on the invoice 202. In one or more embodiments, the text extraction 204 is performed using Amazon® Textract®, which returns the extracted data in a JSON format. The extracted text in the JSON format includes a list of blocks 206 that contains, lines, words, keys (e.g., a label "shipping address"), values (e.g., actual shipping address), table cells (including table column names and row names), etc. The blocks 206 are related to each other according to a parent/child paradigm: e.g., a line block containing multiple word blocks is a parent of a single word block. In addition to the extracted text, the blocks 206 also contain the location of the extracted text in the invoice 202 and a confidence of the extraction.

FIG. 3 shows a detailed view of an example invoice 302 based on the principles disclosed herein. Some non-limiting example blocks generated by the text extraction 204 may include {blocktype: "LINE"; text: "Spectrum Lawyers & Consultants"}; {blocktype: "WORD"; text: "Spectrum"}; {blocktype: "TABLE"; cellIds: [ ] 25 items"}; {blocktype: "CELL"; text: "RATE"}. These extracted blocks are just examples and any kind of hierarchical type (i.e., parent-child) information extraction 308 should be considered within the scope of this disclosure.

Fuzzy matching 208 is performed between the extracted text (e.g., within the blocks) and a dictionary of standard fields. In one of more embodiments, the standard fields may correspond to QuickBooks® (QBO) fields. The dictionary includes a mapping that has standard field names as the keys and a list of all possible corresponding field names as values. The key-value pair in this matching is not to be confused with the key-value pairs extracted during the text extraction 204. During the text extraction 204, the general labels are the keys and the specific entry to those labels are the values. Here, a standard field name is the key and the variation of the names are the values. For example, if "companyphone" is a standard field, this filed is mapped to a value list of {"mobile," "ph," "phone," "telephone," "phone number," "work ph," "phoneno"}, which are the variations of the "companyphone." As other examples, a standard field "shippingaddress" is mapped to a value list of {"ship to," "shipping to"}, a standard filed "shipvia" is mapped to value "ship via," and a standard field "shipdate" is mapped to {"ship date," "shipping date"}. The fuzzy matching may provide an accurate matching between the different extracted values and the stored dictionary keys.

In one or more embodiments, portions of the extracted text may not get mapped into a standard field. In these cases, the mapping is done to an "others" field. The "others" field mapping is provided to the user for further customization. Additionally, some mappings to the "others" field are removed based on the fine-tuned DistilBERT based mapping, as described below.

The fuzzy matching 208 tries to map the extracted fields to all the standard fields (e.g., keys) in the dictionary. The matched fields are provided as fuzzy matching output in step 214. However, not all standard fields may be mapped. FIG. 4 shows an example mapping 400 between extracted fields 402 and standard fields 404 generated through fuzzy matching, based on the principles disclosed herein. In the illustrated example, specific field values 406 are also shown. As shown, the extracted field "INVOICE #" is mapped to standard field "refnumber," extracted field "DATE" is mapped to standard field "date," and extracted field "TOTAL" is mapped to standard field "total." These matched fields form an example of the fuzzy matching output. A portion of the extracted fields 402, however, remain unmapped. For example, extracted fields "Ref," "Account," "BSB," and "Account Name:" remain unmapped.

For the unmapped fields, step 212 may be executed to invoke a fine-tuned DistilBERT model with a question-answer head for non-extracted fields. The fined-tuned DistilBERT model includes a pre-trained DistilBERT model that is further trained (i.e., fine-tuned) using specific data. In or more embodiments, the DistilBERT model may be trained by a predetermined number of invoices with labeled fields. A portion of the predetermined number of invoices may be randomly selected as training data and the remaining portion can be used as validation data.

In one or more embodiments, three pieces of information are required to train the DistilBERT model: (i) a question, (ii) a context, and (iii) an answer. During the deployment of the trained model, a question and a context are provided—and the trained model provides the answer. For example, a question can be "What is customer name?" and the context can include other information extracted from the invoice 202, 302. With regard to the invoice 202, the context may be "'TAX INVOICE Coastal Superior Cleaning Bill To: Agustin Leannon Jr. 29 Mataram Road 211 Lisha Fork, Angelobury, Woongarrah NSW 2259 NJ 97580-3782 ABN Number: 31 145 042 760 Invoice Number: 636.62 Invoice Date: Sep. 24, 2003 Account Name: Coastal Superior Cleaning BSB: 012 877 Account Number: 466 357 554" Based on the question and the context, the DistilBERT model provides the answer. Operations of DistilBERT models are known in the art, and therefore other details are not provided. Additionally, a DistilBERT model is just an example and any kind of natural language processing model can be used consistent with the principles of this disclosure.

FIG. 5 shows an example mapping 500 generated by the DistilBERT model, based on the principles disclosed herein. The mapping is between questions 502 (corresponding to standard fields) and specific predictions 504 (answers to the questions).

At step 216, the results of the fuzzy matching and DistilBERT models are combined using similarity scores and bounding boxes. The combining of the results avoids duplicates, i.e., avoids mapping the same extracted text to two different standard fields. Avoiding duplicates, however, should not preclude a separate mapping of the same text at different locations of the invoices 202, 302. To satisfy both of these constraints, two separate checks are applied. The first check is to remove duplicates of text having the same geometrical information in the invoices 202, 302. This removal addresses the duplicate mapping of the same text—and at the same geometrical location—the same standard field.

The second check is to ensure that the extracted text mapped to any standard field using the fine-tuned DistilBERT model should not be mapped to the "Others" field using the fuzzy logic disclosed herein. To implement the second check, a function finds a similarity score, indicating a percentage of similarity, between two strings of texts. For two strings s1 and s2 with sets of corresponding words s1_words and s2_words, a number of common words in both s1_words and s2_words is determined. The similarity score is calculated using the following expression:

$$\text{Similarity Score} = \frac{\text{number of words in common}}{\max(\text{number of words in } s1, \text{ number of words in } s2)}$$

For all text that is mapped to the "Others" field using fuzzy logic and to a standard field using DistilBERT, a maximum similarity score is determined between the matched texts. That is, similarity scores between portions of text mapped to the "Others" field and portions of text to standard fields is determined with the goal of eliminating mappings to the "Others" field. For example, mappings of portions of text to the "Others" field having a maximum similarity score greater than a threshold value are discarded. In one or more embodiments, the threshold value is 0.5. This process of discarding errs on the side of a more precise DistilBERT mapping compared to an imprecise mapping to a generic "Others" field.

FIG. 6 shows an example of a final mapping 600 based on the combination of fuzzy matching and a DistilBERT model based matching, based on the principles disclosed herein. As shown, standard fields 602 have been mapped to specific values 604 extracted from the invoice 302.

Returning again to FIG. 2, at step 220, an electronic invoice template is generated. The electronic invoice template uses the standard fields generated in step 216. Additionally, the standard fields are organized in the electronic invoice template based on the geometrical information of the corresponding text extracted from the invoices 202, 302. For example, if the "companyname" field in the invoices 202, 302 is offset from the top left corner by (x, y) pixels, the electronic invoice template will have the same offset for the "companyname" field. Therefore, the formatting and the "look and feel" of the invoices 202, 302 will be preserved in the electronic invoice template.

FIG. 7 shows an electronic template 702, based on the principles disclosed herein. As shown, the electronic template 702 corresponds to the invoice 302 shown in FIG. 3. Particularly, the electronic template 702 maintains the formatting and look and feel of the invoice 302.

Figure 8:
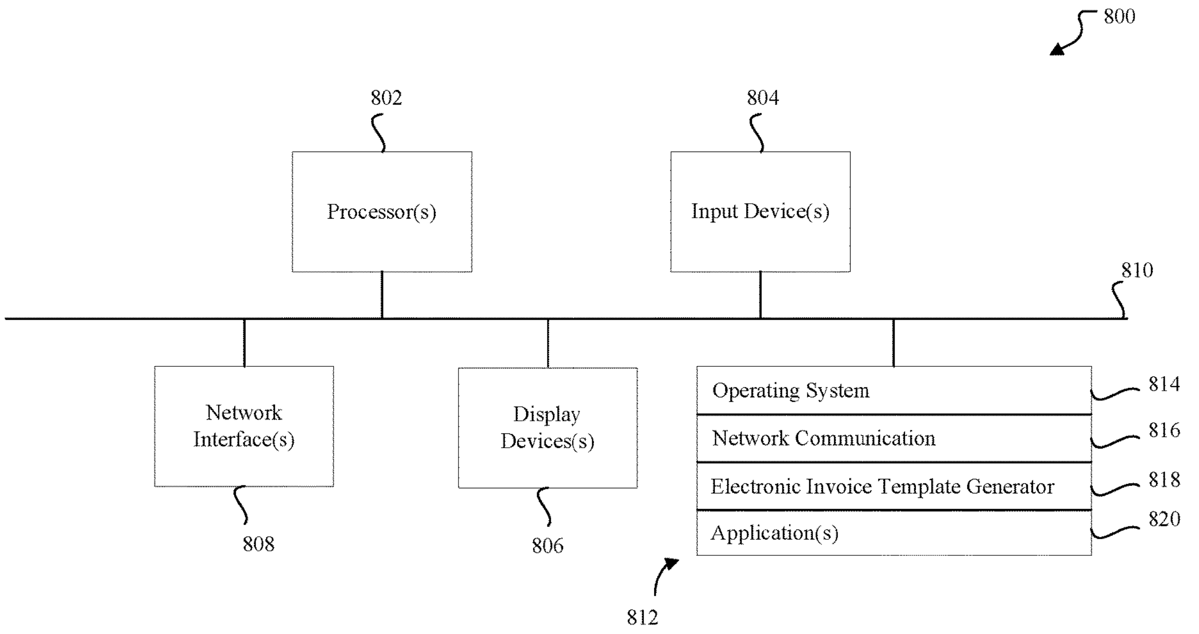
FIG. 8 shows a block diagram of an example computing device that implements various features and processes, based on the principles disclosed herein.

FIG. 8 shows a block diagram of an example computing device 700 that implements various features and processes, based on the principles disclosed herein. For example, computing device 800 may function as first server 120, second server 130, client 150*a*, client 150*b*, or a portion or combination thereof in some embodiments. The computing device 800 may perform one or more steps of the method 200. The computing device 800 is implemented on any electronic device that runs software applications derived from compiled instructions, including without limitation personal computers, servers, smart phones, media players, electronic tablets, game consoles, email devices, etc. In one or more embodiments, the computing device 800 includes one or more processors 802, one or more input devices 804, one or more display devices 806, one or more network interfaces 808, and one or more computer-readable media 812. Each of these components is be coupled by a bus 810.

Display device 806 includes any display technology, including but not limited to display devices using Liquid Crystal Display (LCD) or Light Emitting Diode (LED) technology. Processor(s) 702 uses any processor technology, including but not limited to graphics processors and multi-core processors. Input device 804 includes any known input device technology, including but not limited to a keyboard (including a virtual keyboard), mouse, track ball, and touch-sensitive pad or display. Bus 810 includes any internal or external bus technology, including but not limited to ISA, EISA, PCI, PCI Express, USB, Serial ATA or FireWire. Computer-readable medium 812 includes any non-transitory computer readable medium that provides instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 812 includes various instructions 814 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 804; sending output to display device 806; keeping track of files and directories on computer-readable medium 812; controlling peripheral devices (e.g., disk drives, printers, etc.) which can be controlled directly or through an I/O controller; and managing traffic on bus 810. Network communications instructions 816 establish and maintain network connections (e.g., software for implementing communication protocols, such as TCP/IP, HTTP, Ethernet, telephony, etc.).

Electronic invoice template generator module 818 includes instructions that implement the disclosed embodiments for generating the electronic invoice template.

Application(s) 820 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method, comprising:

extracting a plurality of strings and corresponding geometrical information indicating a location of each of the plurality of strings from an electronic document comprising an invoice having a format generated by a first computer application;

executing fuzzy matching between the extracted plurality of strings and a list of standard fields of a second computer application to map a first subset of the plurality of strings to a corresponding first subset of fields;

invoking a trained natural language processing model to map a second subset of the plurality of strings to a corresponding second subset of fields, the natural language processing model being trained by providing training questions, corresponding training context, and corresponding training answers, the invoking comprising providing a question corresponding to a standard field of the second computer application and a corresponding context comprising other strings extracted from the electronic document and receiving a corresponding answer;

combining the mapping of the first subset of the plurality of strings to the corresponding first subset of fields and the mapping of the second subset of plurality of strings to the corresponding second subset of fields, the combining of the mapping comprising:

removing duplicates from the mapping of the first subset of the plurality of strings to the corresponding first subset of fields and the mapping of the second subset of the plurality of strings to the corresponding second subset of fields, the removing of the duplicates comprising removing a mapping of at least one string of the first subset of the plurality of strings to an "other" field in the mapping between the first subset of plurality of strings to the corresponding first subset of fields, the at least one string being similar to a second string in the mapping between the second subset of the plurality of strings and the corresponding second subset of fields, wherein the at least one string is determined to be similar to the second string in response to a similarity score exceeding a threshold value, the similarity score being computed as a number of words in common between the at least one string and the second string divided by a maximum of a number of words in the at least one string and a number of words in the second string, such that the mapping of the second string generated by the trained natural language processing model is retained and the mapping to the "other" field is discarded; and automatically generating an electronic template of the invoice using the combined mapping, the generating comprising positioning each field of the combined mapping within the electronic template at a same offset as the location indicated by the geometrical information of the corresponding string within the electronic document, such that the electronic template replicates the format of the invoice generated by the first computer application and is usable by the second computer application to generate a subsequent invoice having the format.

2. The computer-implemented method of claim 1, the extracting of the plurality of strings comprising:

extracting the plurality of strings as hierarchical text blocks.

3. The computer-implemented method of claim 1, the executing the fuzzy matching comprising:

mapping a string of the first subset of the plurality of strings to a corresponding standard field of the second computer application.

4. The computer-implemented method of claim 1, the invoking of the trained natural language processing model comprising:

invoking a DistilBERT model trained using an organization specific data comprising the training questions, the corresponding training context, and the corresponding training answers.

5. The computer-implemented method of claim 1, the removing of the duplicates further comprising:

removing duplicate mappings of at least one string of the plurality of strings based on a geometrical location of the at least one string within the electronic document.

6. The computer-implemented method of claim 1, wherein the threshold value is 0.5.

7. A system comprising:

a non-transitory computer readable medium storing computer program instructions; and at least one processor configured to execute the computer program instructions to cause operations comprising:

extracting a plurality of strings and corresponding geometrical information indicating a location of each of the plurality of strings from an electronic document comprising an invoice having a format generated by a first computer application;

executing fuzzy matching between the extracted plurality of strings and a list of standard fields of a second computer application to map a first subset of the plurality of strings to a corresponding first subset of fields;

invoking a trained natural language processing model to map a second subset of the plurality of strings to a corresponding second subset of fields, the natural language processing model being trained by providing training questions, corresponding training context, and corresponding training answers, the invoking comprising providing a question corresponding to a standard field of the second computer application and a corresponding context comprising other strings extracted from the electronic document and receiving a corresponding answer;

combining the mapping of the first subset of the plurality of strings to the corresponding first subset of fields and the mapping of the second subset of plurality of strings to the corresponding second subset of fields, the combining of the mapping comprising:

removing duplicates from the mapping of the first subset of the plurality of strings to the corresponding first subset of fields and the mapping of the second subset of the plurality of strings to the corresponding second subset of fields, the removing of the duplicates comprising removing a mapping of at least one string of the first subset of the plurality of strings to an "other" field in the mapping between the first subset of plurality of strings to the corresponding first subset of fields, the at least one string being similar to a second string in the mapping between the second subset of the plurality of strings and the corresponding second subset of fields, wherein the at least one string is determined to be similar to the second string in response to a similarity score exceeding a threshold value, the similarity score being computed as a number of words in common between the at least one string and the second string divided by a maximum of a number of words in the at least one string and a number of words in the second string, such that the mapping of the second string generated by the trained natural language processing model is retained and the mapping to the "other" field is discarded; and automatically generating an electronic template of the invoice using the combined mapping, the generating comprising positioning each field of the combined mapping within the electronic template at a same offset as the location indicated by the geometrical information of the corresponding string within the electronic document, such that the electronic template replicates the format of the invoice generated by the first computer application and is usable by the second computer application to generate a subsequent invoice having the format.

8. The system of claim 7, the extracting of the plurality of strings comprising:

extracting the plurality of strings as hierarchical text blocks.

9. The system of claim 7, the executing the fuzzy matching comprising:

mapping a string of the first subset of the plurality of strings to a corresponding standard field of the second computer application.

10. The system of claim 7, the invoking of the trained natural language processing model comprising:

invoking a DistilBERT model trained using an organization specific data comprising the training questions, the corresponding training context, and the corresponding training answers.

11. The system of claim 7, the removing of the duplicates further comprising:

removing duplicate mappings of at least one string of the plurality of strings based on geometrical location of the at least one string within the electronic document.

12. The system of claim 7, wherein the threshold value is 0.5.

* * * * *